US012801528B2

(12) United States Patent
Maidee

(10) Patent No.: US 12,801,528 B2
(45) Date of Patent: Nov. 17, 2026

(54) ADDRESS TRANSLATION STRUCTURE FOR ACCELERATORS

(71) Applicant: XILINX, INC., San Jose, CA (US)

(72) Inventor: Pongstorn Maidee, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 18/408,307

(22) Filed: Jan. 9, 2024

(65) Prior Publication Data

US 2025/0225077 A1 Jul. 10, 2025

(51) Int. Cl.

| | |
|---|---|
| ***G06F 12/00*** | (2006.01) |
| ***G06F 12/084*** | (2016.01) |
| ***G06F 12/0862*** | (2016.01) |
| ***G06F 12/0873*** | (2016.01) |
| ***G06F 12/1009*** | (2016.01) |

(52) U.S. Cl.

CPC ........ *G06F 12/0862* (2013.01); *G06F 12/084* (2013.01); *G06F 12/0873* (2013.01); *G06F 12/1009* (2013.01)

(58) Field of Classification Search

CPC ............... G06F 12/0862; G06F 12/084; G06F 12/0873; G06F 12/1009

See application file for complete search history.

(56) References Cited

U.S. PATENT DOCUMENTS 8,356,142 B1 * 1/2013 Danilak .............. G06F 12/0862 711/137
2010/0250853 A1 * 9/2010 Krieger ............... G06F 12/1027 711/E12.059
2011/0125971 A1 * 5/2011 Kruglick ............... G06F 12/084 711/E12.001
2011/0283067 A1 * 11/2011 Chen ................... G06F 12/0811 711/E12.001
2014/0149668 A1 * 5/2014 Chaudhary ......... G06F 12/0862 711/119
2015/0106545 A1 * 4/2015 Godard ............... G06F 12/1027 711/3
2016/0062894 A1 * 3/2016 Schwetman, Jr. .. H04L 67/5681 711/137
2017/0024145 A1 * 1/2017 Zghal .................. G06F 12/0862
2017/0185528 A1 * 6/2017 Hansson ............. G06F 12/1009

(Continued)

OTHER PUBLICATIONS

U.S. Appl. No. 18/443,756, filed Feb. 16, 2024 Entitled "Embedded Configurable Engine".

(Continued)

*Primary Examiner* — Arvind Talukdar

(74) *Attorney, Agent, or Firm* — Patterson + Sheridan, LLP

(57) ABSTRACT

Embodiments herein describe a computer architecture including at least one core including a first cache and a second cache, a shared cache, and an accelerator comprising circuitry configured to manage data and instructions transferred between the first and second caches and the shared cache, wherein the accelerator platform is configured to allow an implementation of a user task to perform multi-level prefetching to timely obtain address translation mappings. Address translation mappings are mappings between virtual addresses and physical addresses stored in a page table. The multi-level prefetching includes a first prefetching request (far request), a second prefetching request (near request), and a third prefetching request (now request).

20 Claims, 4 Drawing Sheets

(56) References Cited

U.S. PATENT DOCUMENTS

| | | | | |
|---|---|---|---|---|
| 2019/0188149 | A1* | 6/2019 | Abhishek Raja | G06F 12/0891 |
| 2020/0065257 | A1* | 2/2020 | Ghiggini | G06F 12/0897 |
| 2020/0210346 | A1* | 7/2020 | Britto | G06F 12/0862 |
| 2023/0401160 | A1* | 12/2023 | Huggahalli | G06F 12/1027 |

OTHER PUBLICATIONS

J. Stojkovic, et al., "Memory-Efficient Hashed Page Tables," 2023 IEEE International Symposium on High-Performance Computer Architecture (HPCA), Montreal, QC, Canada, 2023, pp. 1221-1235.

A. Saulsbury, et al., "Recency-based TLB preloading," Proceedings of 27th International Symposium on Computer Architecture (IEEE Cat. No. RS00201), Vancouver, BC, Canada, 2000, pp. 117-127.

G. B. Kandiraju, et al., "Going the distance for TLB prefetching: an application-driven study," Proceedings 29th Annual International Symposium on Computer Architecture, Anchorage, AK, USA, 2002, pp. 195-206.

J. H. Ryoo, et al. "Rethinking TLB designs in virtualized environments: A very large part-of-memory TLB," 2017 ACM/IEEE 44th Annual International Symposium on Computer Architecture (ISCA), Toronto, ON, Canada, 2017, pp. 469-480.

H. Alam, et al., "Do-it-yourself virtual memory translation," 2017 ACM/IEEE 44th Annual International Symposium on Computer Architecture (ISCA), Toronto, ON, Canada, 2017, pp. 457-468.

* cited by examiner

ADDRESS TRANSLATION STRUCTURE FOR ACCELERATORS

TECHNICAL FIELD

Examples of the present disclosure generally relate to an address translation structure for near-cache accelerators.

BACKGROUND

Address translation for accelerators refers to the process of converting virtual addresses used by an application into physical addresses that correspond to locations in the memory hierarchy of a computing system. Accelerators, such as graphics processing units (GPUs) or specialized hardware accelerators for tasks like machine learning, often operate on data stored in the system's memory. To efficiently use these accelerators, the system needs to manage the translation of addresses between the virtual address space of the application and the physical address space of the memory.

Efficient address translation is important for maintaining performance and ensuring that accelerators can access the necessary data in the system's memory. Address translation often involves a combination of hardware mechanisms, such as translation lookaside buffers (TLBs) and direct memory access (DMA) engines, as well as software components, like specialized translation services or libraries.

SUMMARY

One embodiment described herein is a computer architecture including at least one core including a first cache and a second cache, a shared cache, and an accelerator comprising circuitry configured to manage data and instructions transferred between the first and second caches and the shared cache, wherein the accelerator is configured to perform multi-level prefetching to obtain address translation mappings. Address translation mappings are mappings between virtual addresses and physical addresses stored in a page table. The multi-level prefetching includes a first prefetching request (far request), a second prefetching request (near request), and a third prefetching request (now request).

One embodiment described herein is a method for providing at least one core including a first cache and a second cache, providing a shared cache, managing data and instructions transferred between the first and second caches and the shared cache by using an accelerator, and performing, by the accelerator, multi-level prefetching to obtain address translation mappings. Address translation mappings are mappings between virtual addresses and physical addresses stored in a page table. The multi-level prefetching includes a first prefetching request (far request), a second prefetching request (near request), and a third prefetching request (now request).

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
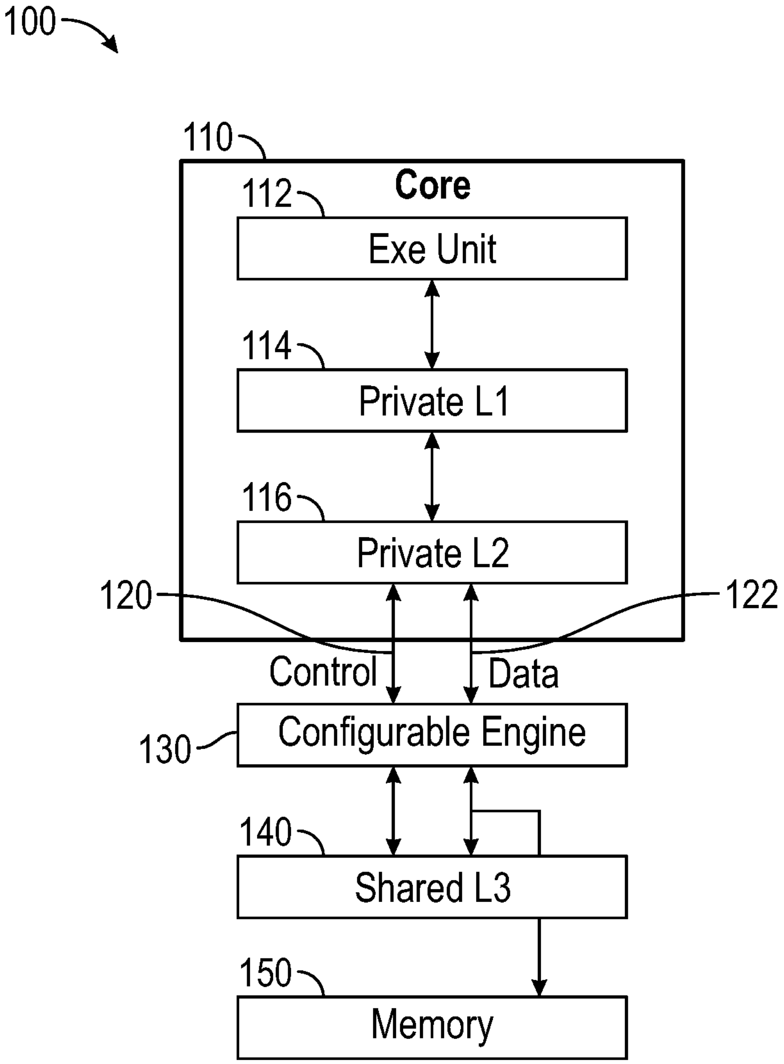
FIG. 1 illustrates logic for a near-cache configurable accelerator, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an address translation structure for near-cache accelerators. The address translation process for near-cache accelerators involves obtaining in a timely manner the mapping of virtual addresses used by the application to the physical addresses of data in both the main memory and the near-cache.

Applications operate in a virtual address space, where each memory access is specified using a physical address. The central processing units (CPUs) translation lookaside buffer (TLB) caches virtual-to-physical address translations for frequently accessed memory locations. TLB entries are used to speed up the translation process. The operating system (OS) maintains page tables that map virtual addresses to physical addresses in the main memory. The page tables are consulted when a TLB miss occurs.

Referring back to page tables, a page table is a data structure used by a virtual memory system in a computer OS to store the mapping between virtual addresses and physical addresses. Virtual addresses are used by the program executed by the accessing process, while physical addresses are used by the hardware, or more specifically, by the random-access memory (RAM) subsystem. The page table is a key component of virtual address translation that is necessary to access data in memory.

When a process requests access to data in its memory, it is the responsibility of the OS to map the virtual address provided by the process to the physical address of the actual memory where that data is stored. The page table is where the OS stores its mappings of virtual addresses to physical addresses, with each mapping also known as a page table entry (PTE).

The memory management unit (MMU) inside the CPU stores a cache of recently used mappings from the OS's page table. This is called the TLB, which is an associative cache.

TLB is a cache of the page table representing only a subset of the page-table contents. TLB speeds up the translation of virtual addresses to physical addresses by storing the page-table in faster memory.

The TLB is a memory cache that stores the recent translations of virtual memory to physical memory. The TLB is used to reduce the time taken to access a user memory location. The TLB can be called an address-translation cache. The TLB is a part of the chip's MMU. The TLB may reside between the CPU and the CPU cache, between CPU cache and the main memory or between the different levels of the multi-level cache. The TLB has a fixed number of slots containing page-table entries and segment-table entries. Page-table entries map virtual addresses to physical addresses and intermediate-table addresses, while segment-table entries map virtual addresses to segment addresses, intermediate-table addresses and page-table addresses.

When a virtual address needs to be translated into a physical address, the TLB is searched first. If a match is found, which is known as a TLB hit, the physical address is returned and memory access can continue. However, if there is no match, which is called a TLB miss, the MMU or the OS's TLB miss handler will typically look up the address mapping in the page table to determine whether a mapping exists, which is called a page walk. The page walk is time-consuming when compared to the processor speed, as it involves reading the contents of multiple memory locations and using them to compute the physical address.

If one exists, it is written back to the TLB, which must be done because the hardware accesses memory through the TLB in a virtual memory system, and the faulting instruction is restarted, which may happen in parallel as well. The subsequent translation will result in a TLB hit, and the memory access will continue.

The page table lookup may fail, triggering a page fault. The lookup may fail if there is no translation available for the virtual address, meaning that virtual address is invalid. This will typically occur because of a programming error, and the OS takes some action to deal with the issue. On modern OSs, it will cause a segmentation fault signal being sent to the offending program. The lookup may also fail if the page is currently not resident in physical memory. This will occur if the requested page has been moved out of physical memory to make room for another page. In this case, the page is paged out to a secondary store located on a medium such as a hard disk drive (this secondary store, or "backing store", is often called a swap partition if it is a disk partition, or a swap file or page file if it is a file). When this happens the page is taken from the disk and put back into the physical memory. A similar mechanism is used for memory-mapped files, which are mapped to virtual memory and loaded to physical memory on demand.

Near-cache accelerators can reduce application runtime by offloading tasks that are inefficient to run on the cores. Near-cache accelerators directly access the cache, and, thus, address translations are required. The accelerator platform can be configured to implement an accelerator of a user task. The exemplary invention introduces a translation structure that does not rely on a core's TLBs. Not only does the structure not degrade the core's TLB performance, but it also enables customization for low latency translation needed for maximum benefits of such accelerators. The exemplary structure enables the near-cache accelerator to use the existing page tables unmodified in a way that still maintains a boundary between the OS and the users.

The near-cache accelerators operate on virtual address space but need to access the memory using physical addresses. Thus, address translations are necessary. The exemplary invention further presents a translation scheme and structure that allows an implementation to perform translation prefetching specifically for a target use case. This scheme allows the user task itself to control how far ahead to prefetch and when to bring the translation mapping into the TLB. As a result, the exemplary structure has low area overhead and yet still provides the low enough latency translation needed for the target use case, without changing the organization of page tables.

The exemplary invention allows a user task to schedule address translation dedicated to near-cache accelerators by providing for multi-level prefetch requests. In particular, three pre-fetch requests are provided to the user task. The multi-level pre-fetch requests require small upfront area and only use memory to improve translation performance per target use case if needed. Thus, three types of prefetch translation requests are employed by a user task to orchestrate when to bring in the mapping.

FIG. 1 illustrates logic for a near-cache configurable accelerator, according to an example.

The system 100 includes a core 110 communicating with an accelerator 130 by using instruction cache 120 and data cache 122. The core 110 includes an execution unit 112, L1 cache 114, and L2 cache 116. The accelerator 130 is placed between the core 110 and the L3 cache 140. The L3 cache 140 is coupled to the main memory 150.

The execution unit 112 of the core 110 performs the actual operations such as, but not limited to, branching, mathematical operations, and memory operations.

In this example, these caches 114, 116 are private caches that are accessible only to execution units in the core 110 (and not to other cores in the processor).

Cache memory is a chip-based computer component that makes retrieving data from the computer's memory more efficient. Cache memory acts as a temporary storage area that the computer's processor can retrieve data from easily. This temporary storage area, known as a cache, is more readily available to the processor than the computer's main memory source, typically some form of dynamic random access memory (DRAM). In order to be close to the processor, cache memory needs to be much smaller than main memory. Consequently, cache memory has less storage space. Cache memory is also more expensive than main memory, as it is a more complex chip that yields higher performance. What it sacrifices in size and price, cache memory makes up for in speed. Cache memory operates between 10 to 100 times faster than RAM, requiring only a few nanoseconds to respond to a CPU request.

Moreover, cache memory is fast and expensive. Traditionally, cache memory is categorized as "levels" that describe its closeness and accessibility to the CPU. There are three general cache levels, that is:

L1 cache 114, or primary cache, that is extremely fast but relatively small, and is usually embedded in the processor chip as CPU cache.

L2 cache 116, or secondary cache, that is often more capacious than L1 cache 114. L2 cache 116 may be embedded on the CPU, or it can be on a separate chip or coprocessor and have a high-speed alternative system bus connecting the cache and CPU.

Level 3 or L3 cache 140 is specialized memory developed to improve the performance of L1 and L2. L1 or L2 can be significantly faster than L3, though L3 is usually double the speed of DRAM. With multicore processors, each core can have dedicated L1 and L2 cache, but they can share an L3 cache.

Cache memory traditionally works under three different configurations.

Direct mapped cache has each block mapped to exactly one cache memory location. Conceptually, a direct mapped cache is like rows in a table with three columns, that is, the cache block that contains the actual data fetched and stored, a tag with all or part of the address of the data that was fetched, and a flag bit that shows the presence in the row entry of a valid bit of data.

Fully associative cache mapping is similar to direct mapping in structure but allows a memory block to be mapped to any cache location rather than to a pre-specified cache memory location as is the case with direct mapping.

Set associative cache mapping can be viewed as a compromise between direct mapping and fully associative mapping in which each block is mapped to a subset of cache locations. It is sometimes called N-way set associative mapping, which provides for a location in main memory to be cached to any of "N" locations in the L1 cache.

Regarding data writing policies, data can be written to memory using a variety of techniques, but the two main ones involving cache memory are write-through and write-back. In write-through, data is written to both the cache and main memory at the same time. In write-back, data is only written to the cache initially. Data may then be written to main memory, but this does not need to happen and does not inhibit the interaction from taking place.

The instruction cache 120 deals with information regarding the operation that the CPU must perform, whereas the data cache 122 holds the data on which the operation is to be performed. The instruction cache 120 and the data cache 122 provide communication between the core 110 and the accelerator 130.

The accelerator 130 can also be referred to as a configurable engine. The accelerator 130 is logically disposed between the L2 cache 116 and the L3 cache 140. That is, the accelerator 130 manages the flow of data between the L2 cache 116 and the L3 cache 140. Further, FIG. 1 illustrates that the accelerator 130 can exchange both control data and application data. The application data can include the data used by (and generated by) the execution unit 112 when executing a particular user application. The control data exchanged between the accelerator 130 and the L2 cache 116 allows the accelerator 130 to query the state of the L2 cache 116 and to invalidate particular cache contents. The control data exchanged between the accelerator 130 and the L3 cache 140 can serve similar functions.

Figure 2:
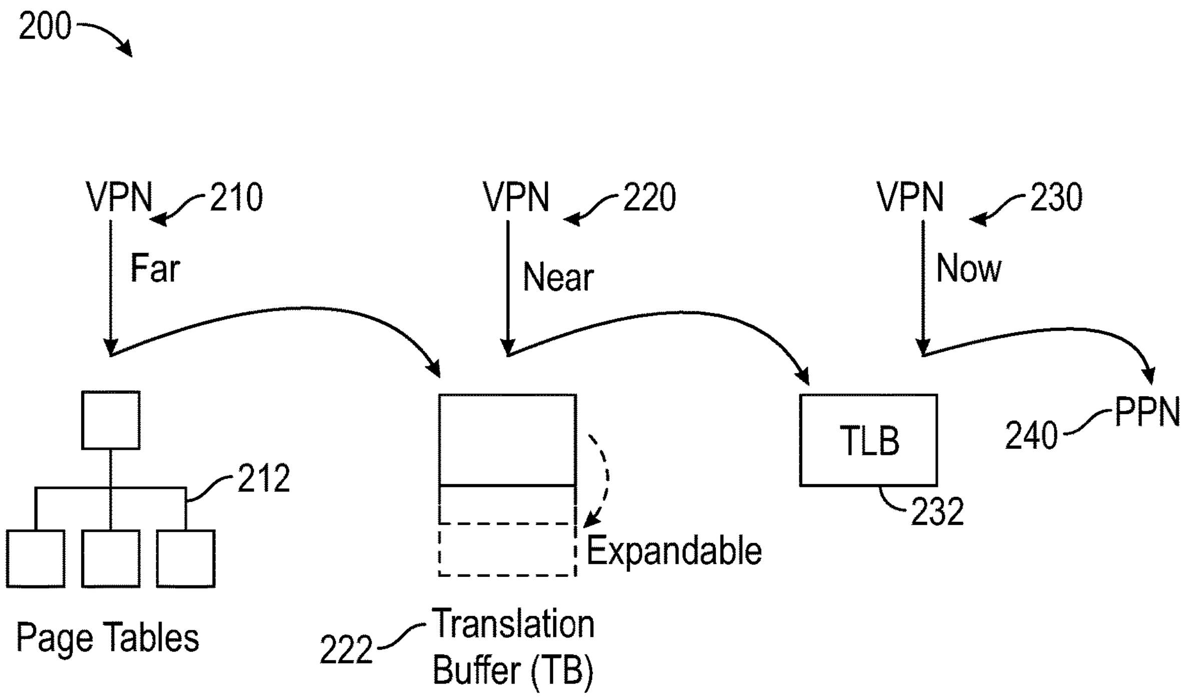
FIG. 2 illustrates a high-level operation of the address translation structure for the near-cache configurable accelerator, according to an example.

FIG. 2 illustrates a high-level operation of the address translation structure for the near-cache configurable accelerator, according to an example.

In the high-level operation 200, three types of prefetch requests can be made for a given virtual page number (VPN). The first request is a far request 210, which accesses page tables 212. The second request is a near request 220, which accesses a translation buffer (TB) 222. The third request is a now request 230, which accesses TLB 232. The translation provides a physical page number (PPN) 240.

The proposed scheme thus presents three types of translation requests to a user to orchestrate when to bring in the mapping. The process can be described as follows.

Because the user task can determine the memory accesses in advance, the user task can issue a "Far" translation request (or far request 210) for a given VPN early to cover the long latency of page table walking. The resulting PPN 240 will be stored in the TB 222 allocated in the memory. A far request 210 should precede the corresponding now request by a predetermined number of cycles. Memory speed is the amount of time it takes RAM to receive a request from the processor and then read or write the data. With faster RAM, the speed at which memory transfers information to other components is increased. RAM is measured in megahertz (MHz), millions of cycles per second, so that RAM can be compared to the processor's clock speed. As such, a memory cycle includes reading the data out of memory and/or writing the data in memory, either by a read/write operation or by separate read and write operations. A far request 210 is thus considered "far" in advance of memory access, where far in advance means in excess of a certain number of cycles. In one example, a far request 210 can be made 2000 cycles before the memory access. In another example, the number of cycles can be in the thousands.

Once the user task determines that a translation will be used soon, the user task issues a "Near" translation request (or near request 220). The required translation will be brought from the TB 222 into the TLB 232 using only one memory read. Even though the access could take hundreds of cycles, the latency is more predictable than a page walk. A page walk can take many memory accesses, and, thus, a page walk's latency can highly fluctuate depending on the memory traffic. Due to this reduced latency variation, the dedicated TLB 232 can be small. A near request 220 is thus considered "near" or close to memory access, where near means within a number of cycles range. In one example, a near request 220 can be made when the number of cycles is between 100 and 200 cycles. In another example, the number of cycles can be in the hundreds. In other words, memory access is close, but not imminent. Thus, address translation based on the near request 220 can be scheduled at a later time compared to the far request. Additionally, a near request 220 only needs one memory access, and, thus, its latency is more predictable than a far request 210.

When the translation is needed immediately, the user task issues a "Now" translation request (or now request 230) and the associated PPN 240 will be obtained within a fixed, small number of cycles. In other words, memory access is imminent or immediate.

Although the TB 222 is in memory, the structure contains a small buffer to allow a "Near" request to be serviced when the result of a "Far" request arrives close to the "Near" request that needs the result. The TB 222 can be implemented in memory as a cache structure, regular or cuckoo hash tables. The TB 222 is allocated in memory within the kernel space specific to a given user process. The user can request more memory from the OS to expand the TB 222 if needed.

In one example, it is possible that a target use case may not need the TB 222. Target use cases that use very few pages, and in a predictable way, will not benefit from the TB 222. Thus, such target use cases would disable the TB 222.

Figure 3:
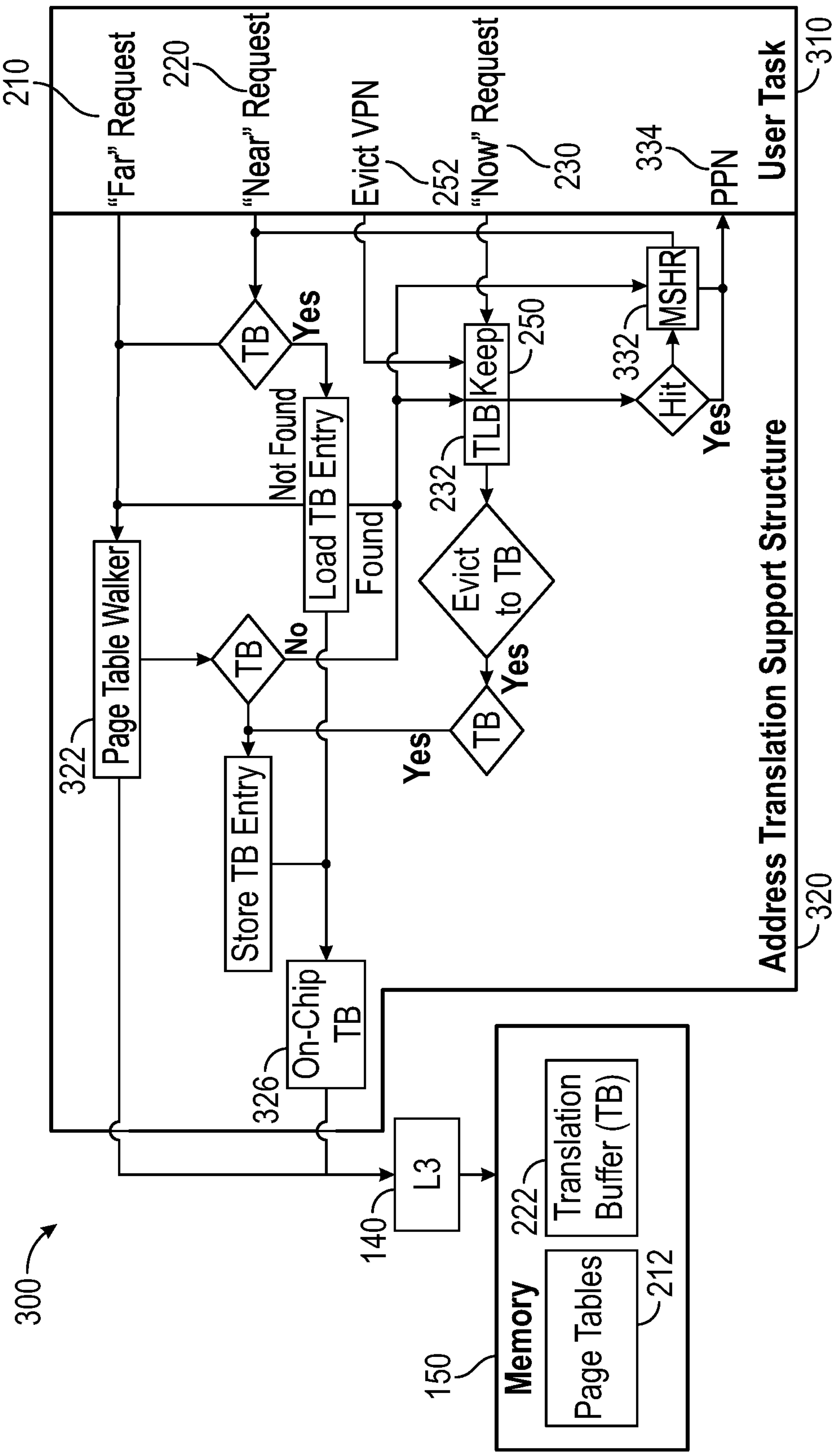
FIG. 3 illustrates a detailed operation of the address translation structure for the near-cache configurable accelerator, according to an example.

FIG. 3 illustrates a detailed operation 300 of the address translation structure for the near-cache configurable accelerator, according to an example.

The accelerator or accelerator platform 130 is divided into two parts. One part that provides address translation support structure 320 and the other part to implement a user task 310 that can be configured at deployment time. The structure 320 can be implemented at tape-out or configured with high privilege before a user task 310.

When TB is not used, the result of a "Far" request will be stored directly in TLB and a "Near" request will be serviced like a "Far" request. If a "Now" request results in a TLB miss, a "Near" request will be issued automatically. This highlights that the proposed structure does not incur unnecessary overhead for well-behaved user tasks both in silicon area and in memory.

When a far request 210 is made by the user task 310, the far request 210 goes through a page table walker 322 to perform a table walk. As such, address mapping is looked up in the page table 212 (FIG. 2) to determine whether a mapping exists. If a translation buffer (TB) 222 is used, the mapping or PPN is stored in storage (i.e., TB 222) and temporarily in buffer 326. Otherwise, it is stored in TLB 232 directly.

When a near request 220 is made by the user task 310, a TB 222 may be used or not depending on the user task 310. If a TB is used and a mapping is found, the TB entry is loaded and stored in TLB 232. If a TB is not used, a near request will trigger page table walker 322 like a far request.

When a now request 230 is made by the user task 310, a TLB 232 is accessed to determine whether a mapping exists. If there is a hit (mapping exists), the PPN 334 is provided to the user task 310. If there is a miss, a near request will be automatically send and a miss status holding register (MSHR) 332 is used to track the miss. When the PPN arrives at TLB 232, some existing entry may be evicted if the TLB 232 is full.

A flag is added and read for entry in the TB 222. When the user task 310 migrates to another chip or die, the flagged entry can be used to populate the TLB 232.

Each request can specify a keep flag to indicate that the corresponding translation should be kept in the TLB until explicitly evicted. For the near request 220 and the now request 230, the flag is kept in keep block 250 inside TLB 232. The VPN is not replaced until the evict VPN 252 has been triggered. The evict VPN 252 will evict the corresponding mapping if it exists.

Moreover, as seen in FIG. 3, a page table entry is not visible to the user task 310 and the access permission is verified by TLB 232 is hidden from the user task 310, similarly to what happens in the core 110 (FIG. 1). Further, there is no need to change the OS to provide customized address translation.

The advantages of the present invention include at least, for any target use case, that the worst-case translation latency can be bounded and small. The exemplary invention incurs small area overhead, while allowing user tasks with high translation demand to expand their capacity in memory. The exemplary invention maintains OS-user separation like that in the core and avoids degrading the core's performance.

Figure 4:
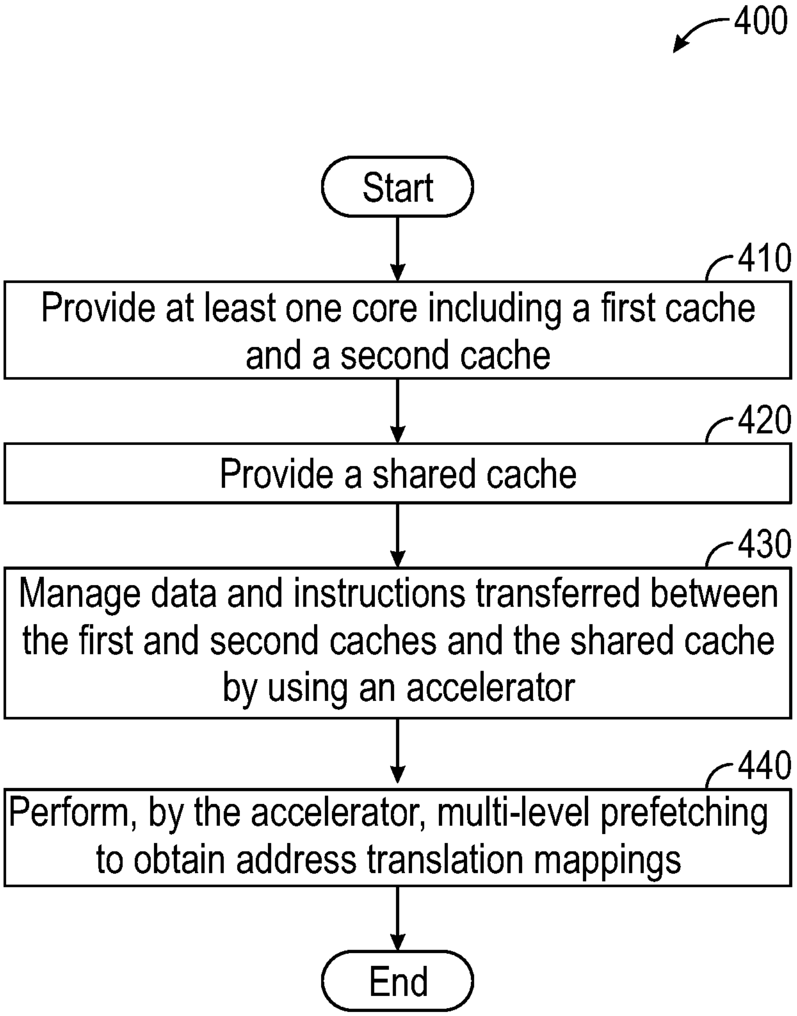
FIG. 4 illustrates a method for implementing the address translation structure for the near-cache configurable accelerator, according to an example.

FIG. 4 illustrates a method 400 for implementing the address translation structure for the near-cache configurable accelerator, according to an example.

At block 410, at least one core is employed including a first cache and a second cache. The first cache is an L1 cache and the second cache is an L2 cache.

At block 420, a shared cache is employed. The shared cache is an L3 cache. The L3 cache is coupled to the main memory.

At block 430, data and instructions transferred between the first and second caches and the shared cache are managed by using an accelerator. The accelerator can also be referred to as a configurable engine. The accelerator is logically disposed between the L2 cache and the L3 cache. That is, the accelerator manages the flow of data between the L2 cache and the L3 cache. The accelerator can exchange both control data and application data. The application data can include the data used by (and generated by) the execution unit when executing a particular user application. The control data exchanged between the accelerator and the L2 cache allows the accelerator to query the state of the L2 cache and to invalidate particular cache contents. The control data exchanged between the accelerator and the L3 cache can serve similar functions.

At block 440, multi-level prefetching to obtain address translation mappings is performed by an implementation of an accelerator of a user task. Address translation mappings are mappings between virtual addresses and physical addresses stored in a page table. The multi-level prefetching includes a first prefetching request (far request), a second prefetching request (near request), and a third prefetching request (now request).

In conclusion, the near-cache accelerator can reduce application runtime by offloading tasks that are inefficient to run on the cores. The near-cache accelerator directly accesses the cache, and, thus, address translations are needed. The exemplary invention presents a translation structure that does not rely on the core's TLBs. Not only does the structure not degrade core's TLB performance, but it also enables customization for low latency translation needed for maximum benefits of such accelerators. The structure enables the accelerator to use the existing page tables unmodified in a way that still maintains a boundary between the OS and the users. In other words, the exemplary translation scheme and structure allows an implementation to perform translation prefetching specifically for the target use case. This scheme allows the user task itself to control how far ahead to prefetch and when to bring the translation mapping into the TLB. As a result, the structure has low area overhead and yet still provides the low enough latency translation needed for the use case, without changing the organization of page tables. In other words, the multi-level prefetching is controlled by the near-cache accelerator to reduce translation latency and external storage is used for low upfront overhead and high adaptability.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A computer architecture comprising:

at least one core including a first cache and a second cache;

a shared cache; and an accelerator disposed between the second cache and the shared cache, the accelerator comprising circuitry configured to manage data and instructions transferred between the first and second caches and the shared cache, wherein the accelerator is configured to perform prefetching to obtain address translation mappings using a multi-level translation prefetch mechanism that accesses existing page tables and that includes a memory-resident translation buffer (TB) distinct from a translation lookalike buffer (TLB) of the at least one core, wherein the TB is stored in system memory accessible via memory transactions and stores physical page numbers (PPNs) obtained from page table walks, wherein the multi-level translation prefetch mechanism comprises a plurality of translation prefetch requests corresponding to different times relative to a memory access, including at least a first prefetch request and a second prefetch request, and wherein the first prefetch request causes a page table walk to obtain a PPN and stores the PPN in the TB, and the second prefetch request causes transfer of the PPN from the TB to the TLB without performing a page table walk.

2. The computer architecture of claim 1, wherein the address translation mappings are mappings between virtual addresses and physical addresses stored in a page table.

3. The computer architecture of claim 1, wherein the multi-level translation prefetch mechanism is configured to allow a user task to control when the plurality of translation prefetch requests are issued relative to the memory access.

4. The computer architecture of claim 3, wherein the first prefetch request is a far address translation request preceding the memory access by a predetermined number of cycles.

5. The computer architecture of claim 4, wherein the memory-resident TB is maintained under control of the accelerator and is physically and functionally separate from the TLB and stored in the system memory.

6. The computer architecture of claim 4, wherein, when the far address translation request is processed, a physical page number (PPN) associated with the far address translation request is stored in the TB associated with the far address translation request.

7. The computer architecture of claim 3, wherein the second prefetch request is a near address translation request preceding the memory access by a number of cycles.

8. The computer architecture of claim 7, wherein the accelerator transfers prefetched PPNs from the memory-resident TB to the TLB in response to the near address translation request.

9. The computer architecture of claim 7, wherein, when the near address translation request is processed, a PPN associated with the near address translation request is transferred from the memory-resident TB to the TLB.

10. The computer architecture of claim 3, wherein a third prefetch request is a now address translation request where the memory access is to be performed.

11. The computer architecture of claim 10, wherein, when the now address translation request is processed, a PPN associated with the now address translation request is retrieved from a translation lookaside buffer (TLB) associated with the now address translation request.

12. The computer architecture of claim 11, wherein the now address translation request is flagged in the TLB to control retention of the PPN in the TLB.

13. A method comprising:

providing at least one core including a first cache and a second cache;

providing a shared cache;

managing data and instructions transferred between the first and second caches and the shared cache by using an accelerator disposed between the second cache and the shared cache; and performing, by the accelerator, prefetching to obtain address translation mappings using a multi-level translation prefetch mechanism that accesses existing page tables and that includes an memory-resident translation buffer (TB) distinct from a translation lookalike buffer (TLB) of the at least one core, wherein the TB is stored in system memory accessible via memory transactions and stores physical page numbers (PPNs) obtained from page table walks, wherein the multi-level translation prefetch mechanism comprises a plurality of translation prefetch requests corresponding to different times relative to a memory access, including at least a first prefetch request and a second prefetch request, and wherein the first prefetch request causes a page table walk to obtain a PPN and stores the PPN in the TB, and the second prefetch request causes transfer of the PPN from the TB to the TLB without performing a page table walk.

14. The method of claim 13, wherein the multi-level translation prefetch mechanism is configured to allow a user task to control when the plurality of translation prefetch requests are issued relative to the memory access.

15. The method of claim 14, wherein the first prefetch request is a far address translation request preceding the memory access by a predetermined number of cycles.

16. The method of claim 15, wherein, when the far address translation request is processed, a physical page number (PPN) associated with the far address translation request is stored in the TB associated with the far address translation request.

17. The method of claim 14, wherein the second prefetch request is a near address translation request preceding the memory access by a number of cycles.

18. The method of claim 17, wherein, when the near address translation request is processed, a PPN associated with the near address translation request is transferred from the memory-resident TB to the TLB in response to the near address translation request.

19. The method of claim 14, wherein a third prefetch request is a now address translation request where the memory access is imminent.

20. The method of claim 19, wherein, when the now address translation request is processed, a PPN associated with the now address translation request is retrieved from the TLB associated with the now address translation request.

* * * * *